United States Patent [19]

Linder et al.

[11] Patent Number: 5,002,086
[45] Date of Patent: Mar. 26, 1991

[54] PLASTIC CONTROL VALVE

[75] Inventors: James C. Linder, Shorewood; Jeffrey J. McKenzie, Watertown, both of Minn.

[73] Assignee: Fluoroware, Inc., Chaska, Minn.

[21] Appl. No.: 522,269

[22] Filed: May 11, 1990

[51] Int. Cl.[5] .................. F16K 31/26; F16K 31/44
[52] U.S. Cl. .................. 137/312; 92/98 R; 251/61.4; 251/61.5; 251/214; 251/335.2; 251/327; 251/323; 251/367
[58] Field of Search ............. 251/61.4, 61.5, 331, 251/335.2, 366, 367, 214, 322, 323; 137/312; 92/86

[56] References Cited

U.S. PATENT DOCUMENTS

| | | |
|---|---|---|
| 1,042,745 | 10/1912 | Zahm . |
| 2,031,478 | 2/1936 | Gray . |
| 2,114,933 | 4/1938 | Nielson . |
| 2,382,235 | 8/1945 | Lamar . |
| 2,638,307 | 5/1953 | Fortune .................. 251/335.2 |
| 2,659,565 | 11/1953 | Johnson et al. .................. 251/331 |
| 2,675,204 | 4/1954 | Johnson . |
| 2,770,799 | 11/1956 | Horn . |
| 2,934,090 | 4/1960 | Kennann et al. .................. 137/625.5 |
| 3,034,761 | 5/1962 | Janquart .................. 251/210 |
| 3,154,288 | 10/1964 | Tripoli . |
| 3,307,574 | 3/1967 | Anderson . |
| 3,451,423 | 6/1969 | Priese .................. 251/331 |
| 4,010,769 | 3/1977 | De Lorenzo et al. .................. 137/312 |
| 4,180,239 | 12/1979 | Valukis .................. 251/335.2 |
| 4,232,696 | 11/1980 | Burris et al. .................. 137/62 |
| 4,280,680 | 7/1981 | Payne .................. 251/175 |
| 4,343,456 | 8/1982 | Zitzloff .................. 251/255 |
| 4,720,076 | 1/1988 | Hyde .................. 251/122 |
| 4,750,709 | 6/1988 | Kolenc et al. .................. 251/335 |
| 4,819,691 | 4/1989 | Lofgren et al. .................. 251/331 |
| 4,872,638 | 10/1989 | Thompson et al. .................. 251/335.2 |

FOREIGN PATENT DOCUMENTS 941421 6/1960 United Kingdom .

OTHER PUBLICATIONS

Nacom Industries, Incorporated Brochure 285291, "A", Mar. 1984.

Primary Examiner—Goerge L. Walton
Attorney, Agent, or Firm—Palmatier & Sjoquist

[57] ABSTRACT

A free draining, corrosive resistent valve for regulating the flow of corrosive fluids therethrough includes a plastic valve housing. An inlet passage extends into the housing and upwardly therein terminating in a valve seat. An inclined panel surrounds the inlet passage below the valve seat. An outlet passage extends from the lower most portion of the inclined panel through the housing. A plastic valve poppet is located above the seat having a diaphragm therearound with an upwardly extending stem. A plastic retainer is located above the diaphragm into which the stem extends. The retainer is adapted for affixing the diaphragm is a sealing relationship to the valve housing.

7 Claims, 4 Drawing Sheets

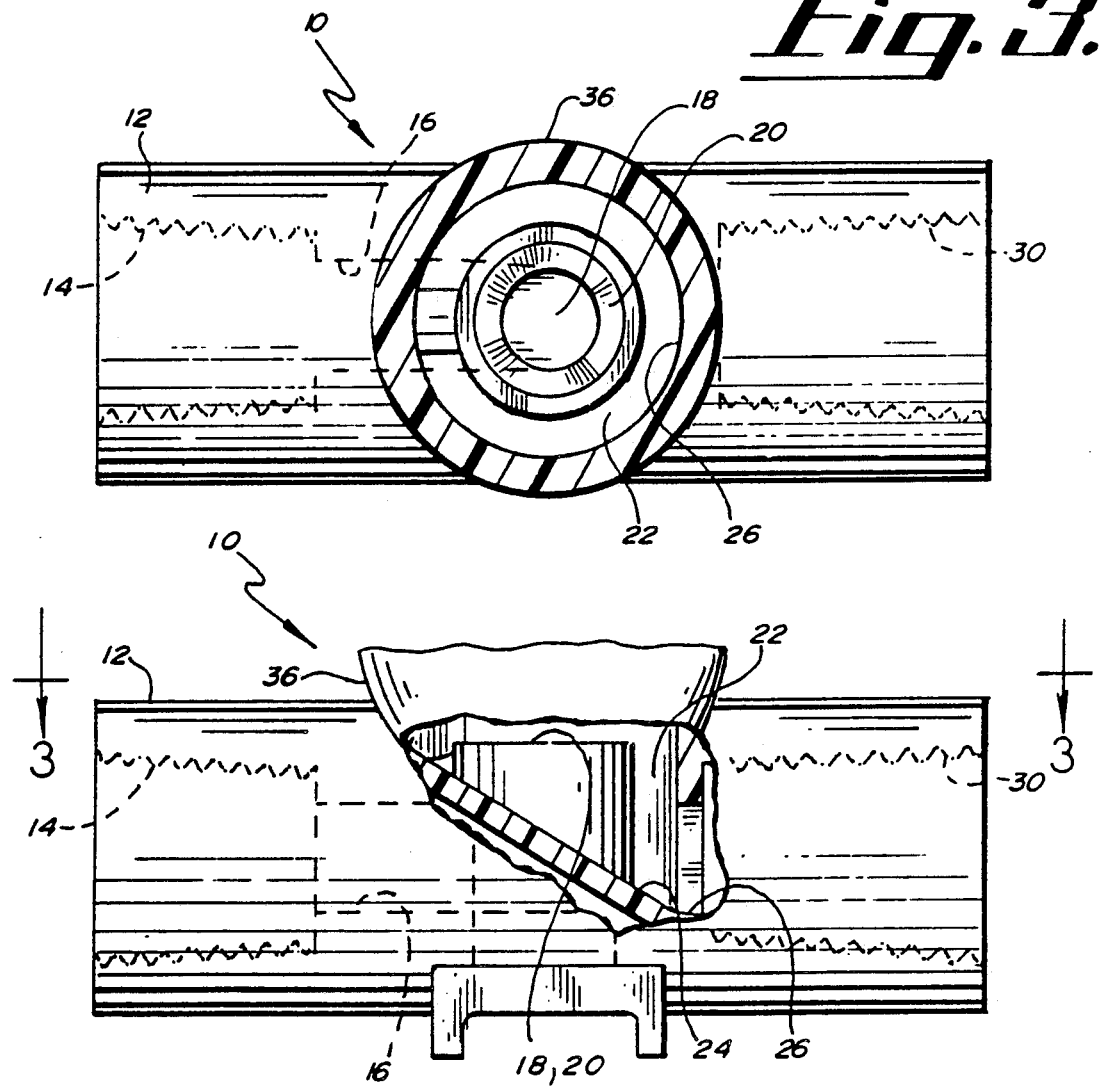
Fig. 3.
Fig. 2.
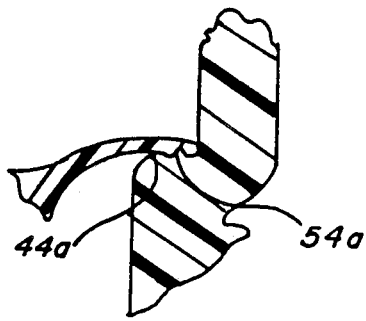
Fig. 1A.

PLASTIC CONTROL VALVE

BACKGROUND OF THE INVENTION

The present invention relates a plastic control valve for handling the flow of highly corrosive fluids.

Highly corrosive fluids, such as acids, are used in many industries, as in the processing of semiconductor wafers. The corrosive effects of such fluids or liquids is further increased when their application requires that the liquids be heated to temperatures ranging from 24° to 150° C. which will increase the corrosive effect of the fluids.

The handling and control of heated corrosive fluids in measured amounts has been problematic. Known valves having metallic parts are short lived in that their exposure to corrosive fluids will eventually destroy the valves. Furthermore, many applications absolutely require that metallic particles not be permitted to enter into the stream of the corrosive fluids or liquids which may destroy the usefulness of such fluids. The structure of known valves also may have what is known as a dead volume of fluid. That is, fluid may rest within the valve housing such as below the valve seat. The dead volume of fluid makes these valves difficult to flush and clean and may have corroding effects on valve parts.

Construction of valves out of polymers or plastics in combination with metal parts has been attempted to solve these known problems with minimal success. The nature of plastics and polymers allow permeation which will permit corrosive fumes from the corrosive fluids in the valve to work upon the internal operational parts of the valve and similarly render such valves short lived.

The handling of highly corrosive fluids by known valves has by necessity also required difficult and frequent inspection as well as repair to insure the integrity of the control valves. Disassembly of complex valve structures is time consuming and requires down time while the valve is disassembled for inspection and replacement of certain parts.

There is an need for a free draining, corrosive resistent plastic control valve that has a long life and renders itself easy to inspect and repair.

SUMMARY OF THE INVENTION

A free draining, corrosive resistent valve for regulating the flow of corrosive and hot fluids therethrough includes a plastic valve housing. An inlet passage extends into the housing and upwardly therein terminating in a valve seat. An inclined panel surrounds the inlet passage below the valve seat. An outlet passage extends from the lower most portion of the inclined panel through the housing. A plastic valve poppet is located above the seat having a diaphragm therearound with an upwardly extending stem. A plastic retainer is located above the diaphragm into which the stem extends. The retainer is adapted for affixing the diaphragm in a sealing relationship to the valve housing.

A principal object and advantage of the present valve is that it is extremely simple with a long life offering great versatility and integrity in handling hot corrosive fluids.

Another object and advantage of the present invention is that it has no metal parts exposed to corrosive fluids, fumes permeating from the fluids, or a hazardous environment into which the valve may be situated.

Another object and advantage of the present invention is that the valve is free draining thereby minimizing dead volume within the valve housing which further contributes to the long life of the valve, permits the delivery of corrosive fluids in exact amounts, and facilitates easy flushing and cleaning of the valve.

Another object and advantage of the present invention is that the valve easily disassembles and permits access to inside the valve through a removable cap or top for easy inspection and repair.

BRIEF DESCRIPTION OF THE DRAWINGS

FIG 1A is a detail section view illustrating an alternative embodiment of the sealing between the diaphragm and the shoulder of the housing.

FIG. 2 is an elevational view of the flow housing of the present invention partially broken away;

FIG. 3 is a cross-sectional plan view of the present invention taken along lines 3—3 of FIG. 2;

DETAILED DESCRIPTION OF THE PREFERRED EMBODIMENT

Figure 1:
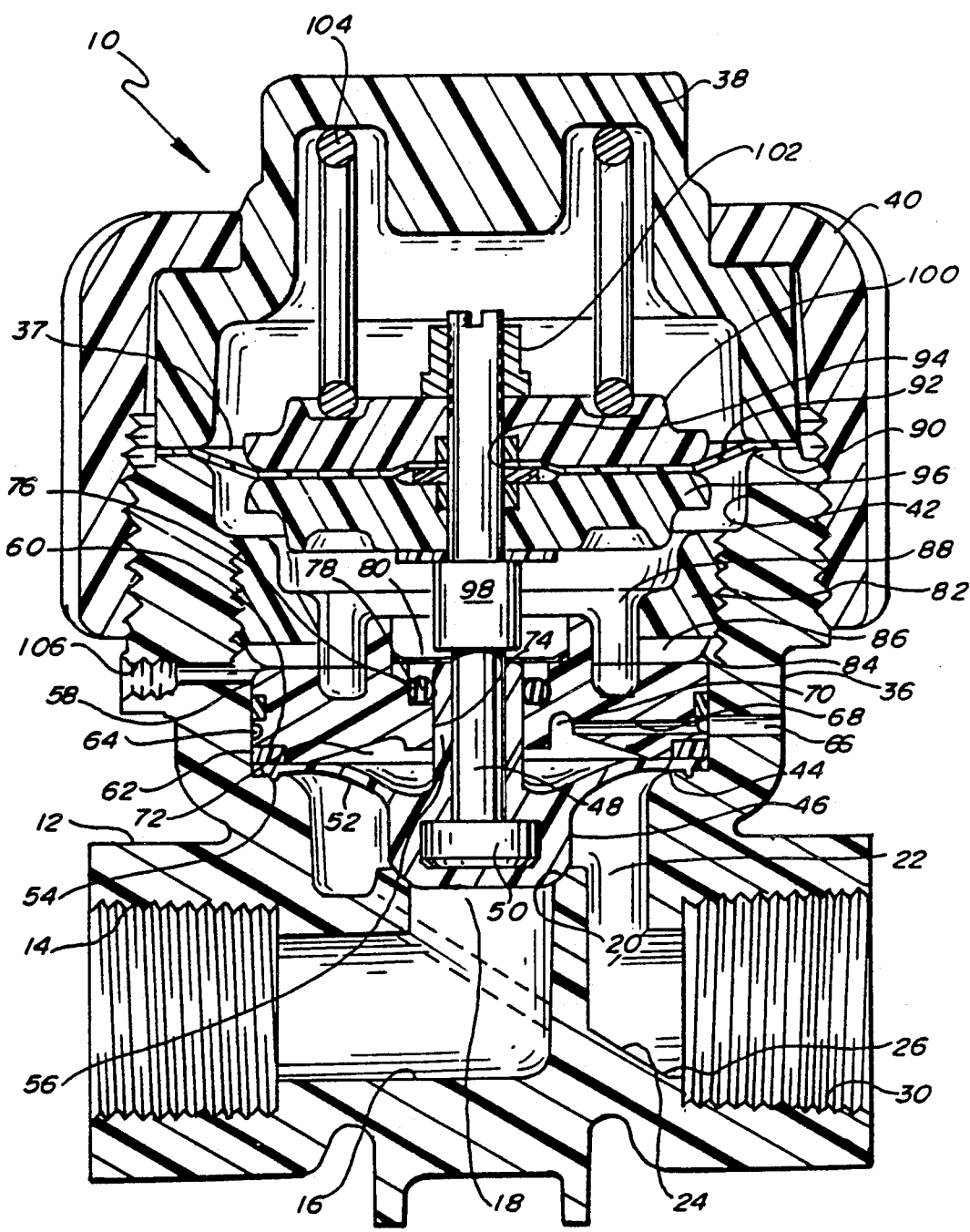
FIG. 1 is a cross-sectional elevational view of the present invention.

Referring to FIGS. 1-3, the plastic control valve 10 generally includes an inlet passage 16, which ends in a valve seat 20, with an inclined sloping bottom or panel 24 below the valve seat 20 where outlet passage 26 begins. A valve poppet or head 46 is located above the valve seat 20 and has an integral sealing diaphragm 52 and a stem 56 therewith. The stem 56 extends upwardly into a diaphragm retainer 58.

More specifically, the plastic control valve 10 includes a flow housing 12 having an inlet 14 which is threaded. Inlet 14 leads into the inlet passage 16 which terminates upwardly into an open port 18 whereat a valve seat 20 is located in a valve chamber 22. The valve chamber 22 has a sloping or inclined bottom or panel 24 which is suitably surrounding the inlet passage 16 just below the valve seat 20. At the bottom of the incline panel 24, outlet passage 26 begins terminating in threaded outlet 30 leading out of the flow housing 12.

Control housing 36 is located above and integral with flow housing 12. Control housing 36 has an open top suitably which may be closed by a top or cap 38 and retained thereat by a cap retaining ring 40 which may be threaded onto the outer side of the control housing 36. Housing 36 also has an inner wall 42 with an annular shoulder 44.

Valve poppet or head 46 is movably located above the valve seat 20. Flexible diaphragm surrounds and is integral with the poppet 46 at its inner circumference from which stem or sleeve 56 extends upwardly. A valve operating shaft 48 is encapsulated with its head 50 located within the poppet 46 as shaft 48 extends upwardly through the diaphragm 52 and the stem 56. Diaphragm 52 may have on its underside adjacent its outer circumference a bead or integral O-ring 54 therearound which sealably may sit upon annular shoulder 44. Alternatively, the sealing bead 54a may be integrally formed upon the annular shoulder 44a as shown in FIG. 1A.

Diaphragm retainer 58 fits within the control housing 36 and has a bottom O-ring seat 60 wherein a bottom O-ring 62 is located for seating upon the top side of diaphragm 52 in sealing relation. Retainer 58 also has an annular groove 64 therearound, which is in communication with a housing vent 66 and a vent passage 68. Passage 68 further communicates with a vent opening 70 and into vent space 72 above the diaphragm 52. By this arrangement, fumes in the vent space 71 above the diaphragm 52 are vented out through housing vent 66 into the environment.

Retainer 58 also has a central aperture or opening 74 with an inner O-ring seat 76 thereat where an inner O-ring 78 is located and held thereat by O-ring retainer 80. The stem 56 encapsulating operating shaft 48 passes upwardly through O-ring 78 and the central aperture 74 of the retainer 58.

Retainer nut 82 is suitably threaded into a threaded section of the inner wall 42 to effectively lock the diaphragm retainer 58 down onto the diaphragm 52 into a sealing relationship with the annular shoulder 44.

In the first embodiment of the invention, the retainer nut 82 has a lower chamfered periphery 84 with diametrically arranged bottom channels 86 which lead into central opening 88. At upper housing wall edge 90, a second plastic valve operating diaphragm 92 is seated which has a central aperture 94 through which passes the valve operating shaft 48.

Below the diaphragm 92 is located a bottom piston 96 which is held thereat by a collar 98 on shaft 48. On the top side of the diaphragm 92 is located a top piston 100 and which is held against the diaphragm 92 by a threaded nut 102 affixed onto the distal end of valve operating shaft 48. Spring 104 extends between the top side of top piston 100 and the underside of cap 38 to bias the operating shaft 48 downward and to hold the poppet 46 against the valve seat 20 in a closed steady state.

Air inlet 106 is located in control housing 36 and is in flow communication with the underside of the diaphragm 92 through the camfered periphery 84 of the retainer nut 82 and through channels 86 and the central opening 88. By this arrangement, pressurized air may be introduced into inlet 106 to overcome the bias of spring 104 to thereby lift poppet 46 away from valve seat 20 to permit fluids to pass through plastic control valve 10.

Figure 4:
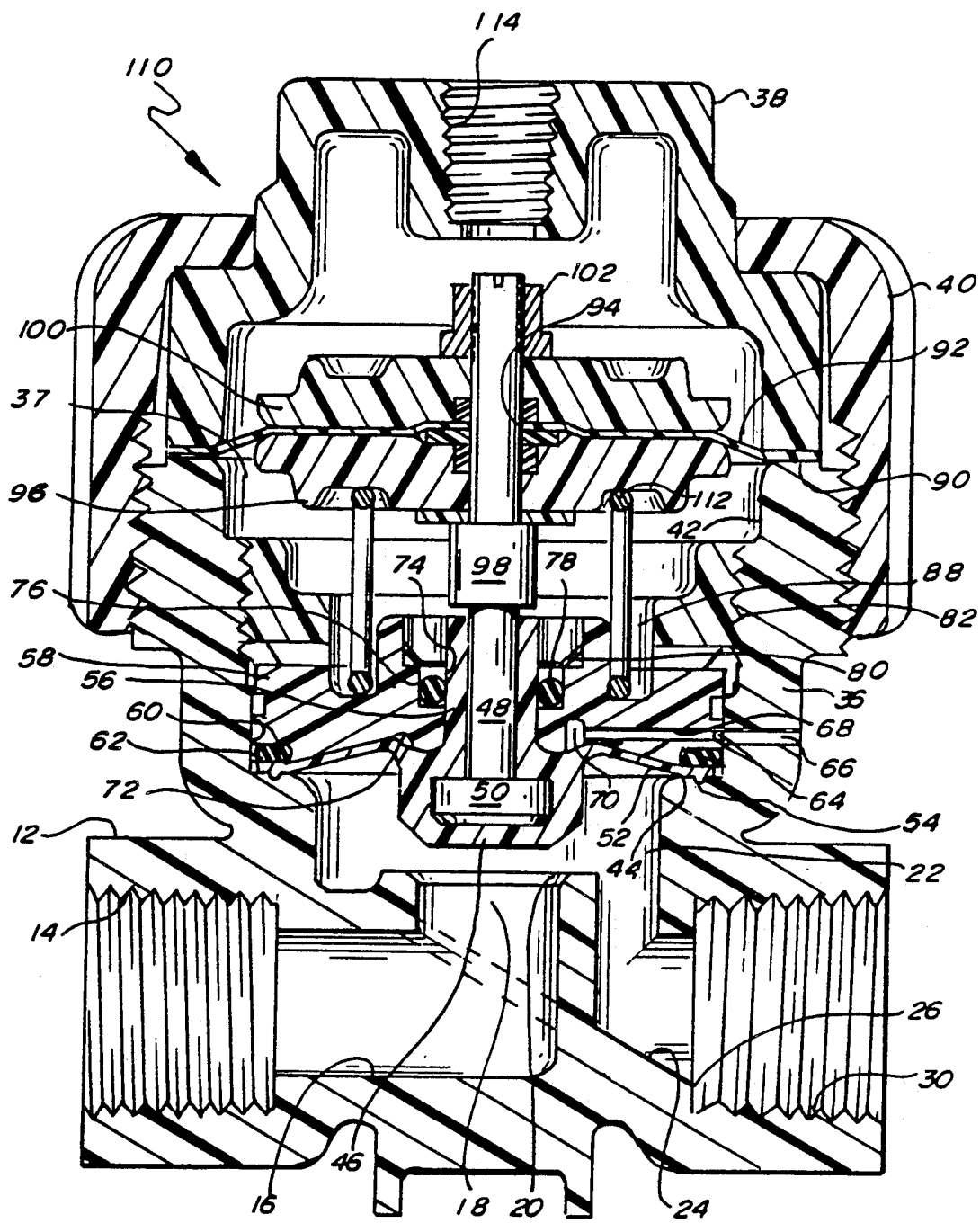
FIG. 4 is a cross-sectional elevational view of another embodiment of the present invention.

Referring to FIG. 4, a second embodiment of the plastic control valve 110 may be seen. Valve 110 is biased in the open position by way of a spring 112 which sits upon the retainer 58 and extends upwardly to the underside of bottom piston 96. Air inlet 114 is located in the cap 38 which permits pressurized air to enter into control housing 36 and move the second diaphragm 92 along with pistons 96 and 110 and valve operating shaft 48 downwardly to effect a closing of the valve 110 by seating the poppet 46 onto the valve seat 20.

Figure 5:
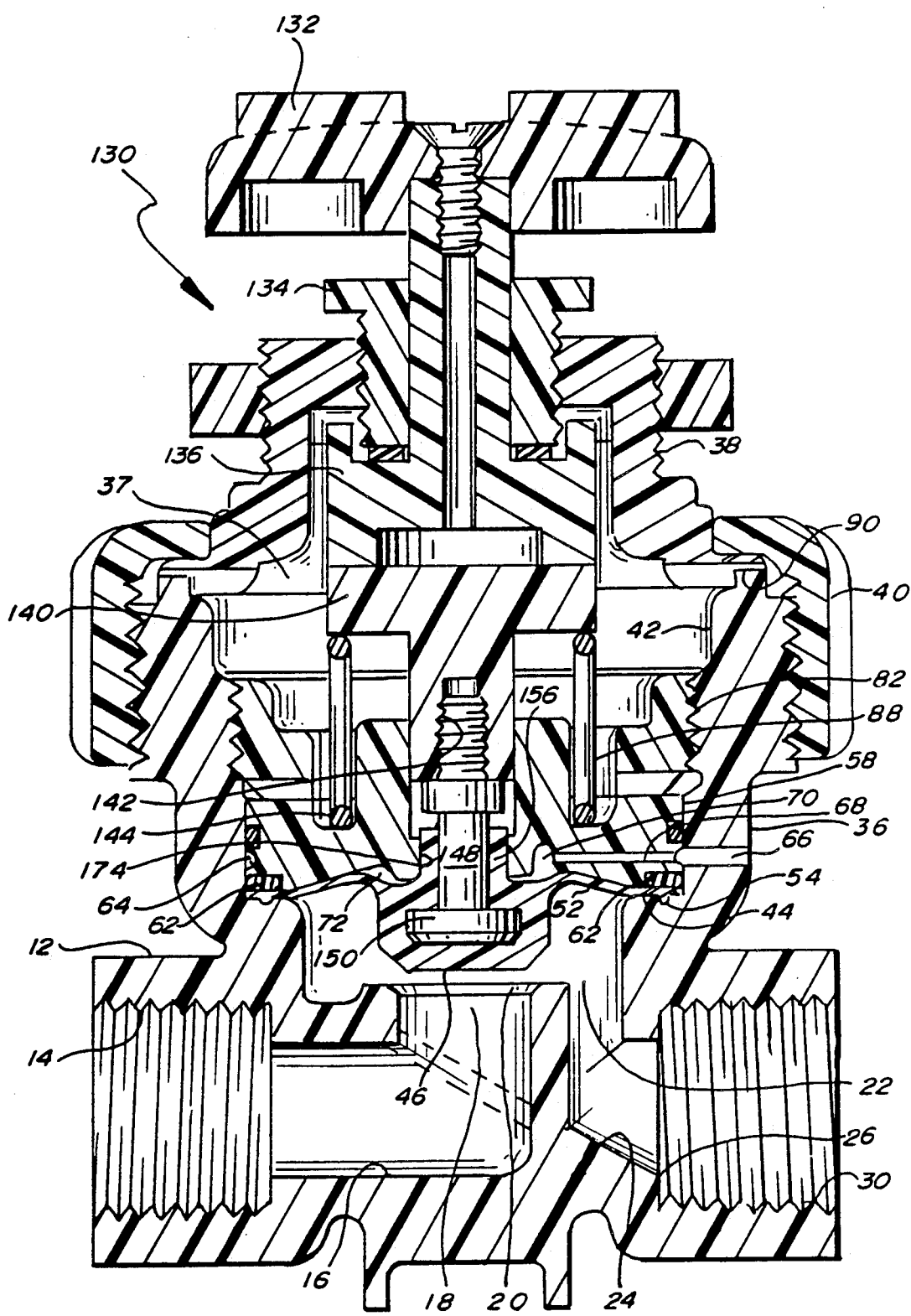
FIG. 5 is a cross-sectional elevational view of yet another embodiment of the present invention.

Referring to FIG. 5, the third embodiment of the plastic control valve 130 may be viewed which is operated by a hand wheel 132. Wheel 132 is fitted into the cap 38 through a collar 134 and is connected to an upper shaft extension 136 and a lower shaft extension 140. Valve operating shaft 148 may then be threaded into a threadable opening 142 of the lower shaft extension 140 while spring 144 rests between the retainer 58 and the lower shaft extension 140 to bias the poppet 46 towards an open position. Shaft 148 suitably may have its head 150 embedded in or encapsulated in poppet 46 as it extends upwardly through stem or sleeve 156 and the central aperture 174 of the retainer 58 which appropriately may be octagonal in cross-section to effectively prevent the rotation or turning of diaphragm 52 and permit only axial movement.

The valve housing 12 and 36 and components of each embodiment of the present invention are suitably made of TEFLON PFA ®, which is a registered trademark of E. I. du Pont de Nemours of Wilmington, Del. The composition of TEFLON PFA ® is a perfluoroalkoxy-substituted polytetrafluoroethylene resin. However, the valve operating shaft may be made of metal or some other hard plastic. Hard plastics found suitable for the present o invention include VESPEL ® which is a registered trademark of E. I. du Pont de Nemours.

These plastics have been found to have a high chemical resistance to corrosion as well as a good temperature resistance. However, the nature of these plastics permit some permeation of fumes of the fluids to pass upwardly through the flow housing 12. For this reason, valve operating shafts 48 and 148 are encapsulated within the valve poppet 46, diaphragm 52 and stem 56. Also, vent space 72 is vented into the environment through vent opening 70, vent passage 68, annular groove 64 and out control housing 36 through housing vent 66. By this arrangement, the valve operating mechanism is not subject to the corrosive effects of the fluids passing through the valve 10.

As explained, the present invention uniquely permits the plastic control valve to take at least three valve embodiments 10, 110 and 130 as clearly shown in FIGS. 1, 4 and 5. The present invention may be operated by hand or under the action of pneumatic pressure while being biased either in the closed or opening position. The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A free-draining, corrosive resistant valve for regulating the flow of corrosive and hot fluids therethrough, comprising
   (a) a plastic valve flow housing having an inlet passage extending into the housing and upwardly therein terminating in a valve seat;
   (b) an inclined panel surrounding the inlet passage below the valve seat;
   (c) an outlet passage extending from the lowermost portion of the inclined panel through the housing;
   (d) a plastic valve poppet above the seat having an integral diaphragm there around with an integral upwardly extending stem;
   (e) a rigid shaft within the poppet encapsulated and extending upwardly through the diaphragm and beyond the stem; and
   (f) a plastic valve control housing above and integral with the flow housing having a removable plastic retainer lockably positioned entirely within the control housing, said retainer having an opening disposed therein for slidably receiving said stem, said retainer having a sealing element disposed in a portion of said opening for slidably and sealably engaging said stem as it moves through said opening, said retainer having a vent passage disposed therein to prevent any corrosive fumes and/or fluids from reaching a valve operating means within the control housing, the retainer being adapted for affixing the diaphragm within the valve housing and between the flow housing and the control housing.

2. The valve of claim 1, wherein the valve control housing has a top opening with a cap for closing the opening for access to the retainer and valve poppet.

3. The valve of claim 1, further comprising a vent space above the diaphragm which is in flow communication to the outside of the valve housing through a passage in the retainer and a vent opening in the housing.

4. The valve of claim 1, wherein the inclined panel is planar.

5. The valve of claim 1, further comprising an annular shoulder in the valve control housing, a bead on the bottom side of the diaphragm adjacent the outer circumference of the diaphragm adjacent the outer circumference of the diaphragm for sealing engagement of the bead and shoulder with the retainer pushing downward thereat and holding such sealing engagement by a retainer nut above the diaphragm.

6. The valve of claim 1, further comprising an annular shoulder in the valve control housing with an integral bead formed thereon for sealing engagement of the bead and the diaphragm with the retainer pushing downward thereat and holding such sealing engagement by a retainer nut above the diaphragm.

7. A free-draining, corrosive resistant value for regulating the flow of corrosive and hot fluids therethrough, comprising (a) a plastic valve control housing with a top opening and a top for closing the opening and a plastic valve flow housing integral with the flow housing having a valve chamber therein with an inclined planar floor and an inner annular shoulder in the control housing above the chamber;

(b) an inlet passage extending into the flow housing and upwardly through the floor into the valve chamber terminating in a valve seat;

(c) an outlet passage extending from the lowermost portion of the inclined floor out through the flow housing;

(d) plastic valve poppet located above the valve seat having an integral diaphragm there around with an outer circumference and an integral upwardly extending stem;

(e) a removable plastic retainer lockably positioned entirely within the control housing with a central aperture therein for slidably receiving said stem, said retainer having a sealing element disposed in a portion of said aperture for slidably and sealably engaging said stem as it moves in said aperture, said retainer having a vent passage disposed therein to prevent any corrosive fumes and/or fluids from reaching a valve operating means within the control housing the plastic retainer being adapted to seal the the annular shoulder of the housing to the diaphragm above the valve flow chamber; and (f) a rigid shaft with a head, the head being encapsulated within the poppet and the shaft extending from the head, through the diaphragm and stem extending upwardly beyond the stem.

* * * * *